(12) United States Patent
Chiang et al.

(10) Patent No.: US 9,771,302 B1
(45) Date of Patent: Sep. 26, 2017

(54) ENVIRONMENTALLY FRIENDLY CEMENT AND PRODUCTION METHOD THEREOF

(71) Applicant: Institute of Nuclear Energy Research, Atomic Energy Council, Executive Yuan, R.O.C., Taoyuan (TW)

(72) Inventors: Sheng-Wei Chiang, Taoyuan (TW); Chao-Chen Hsu, Taoyuan (TW); Kuang-Li Chien, Taoyuan (TW); Kou-Min Lin, Taoyuan (TW); Jen-Chieh Chung, Taoyuan (TW)

(73) Assignee: INSTITUTE OF NUCLEAR ENERGY RESEARCH, ATOMIC ENERGY COUNCIL, EXECUTIVE YUAN, R.O.C., Taoyuan (TW)

( * ) Notice: Subject to any disclaimer, the term of this patent is extended or adjusted under 35 U.S.C. 154(b) by 0 days.

(21) Appl. No.: 15/174,104

(22) Filed: Jun. 6, 2016

(30) Foreign Application Priority Data

Mar. 11, 2016 (TW) .............................. 105107597 A

(51) Int. Cl.
*C04B 14/42* (2006.01)
*C04B 14/10* (2006.01)
*C04B 28/00* (2006.01)

(52) U.S. Cl.
CPC ............ *C04B 14/42* (2013.01); *C04B 14/106* (2013.01); *C04B 28/006* (2013.01)

(58) Field of Classification Search
CPC ...... C04B 14/42; C04B 14/106; C04B 28/006
See application file for complete search history.

(56) References Cited

U.S. PATENT DOCUMENTS

| 8,088,217 B2 * | 1/2012 | Francis ................... C04B 28/04 106/716 |
| 2016/0068440 A1 * | 3/2016 | Spangenberg ........ C04B 28/006 252/62 |

FOREIGN PATENT DOCUMENTS

JP          2003-55888 A  *  2/2003

* cited by examiner

*Primary Examiner* — Anthony J Green
(74) *Attorney, Agent, or Firm* — Locke Lord LLP; Tim Tingkang Xia, Esq.

(57) ABSTRACT

An environmentally friendly cement comprises (1) an active filler comprising waste materials composed of a thermal insulation wool and a waste thereof; (2) an inert filler comprising metakaolin and an aggregate optionally selected from cement, fine sand, gravel, waste to be solidified, and organic resin; and (3) an aqueous solution of sodium metasilicate as an alkaline compound. A method for producing the environmentally friendly cement comprises mixing ingredients (1) and (3) and ingredients (2) and (3) respectively to obtain a slurry A and a slurry B respectively; mixing the slurry A and B; and hardening the final slurry, whereby elements silicon and aluminum in the ingredient (1) are dissolved out in the basic solution of the ingredient (3), and a closed framework structure is formed by bonding silica and alumina as tetrahedrons. The environmentally friendly cement has excellent fire tolerance, heat insulation, acid and alkaline resistance, and mechanical properties.

3 Claims, 1 Drawing Sheet

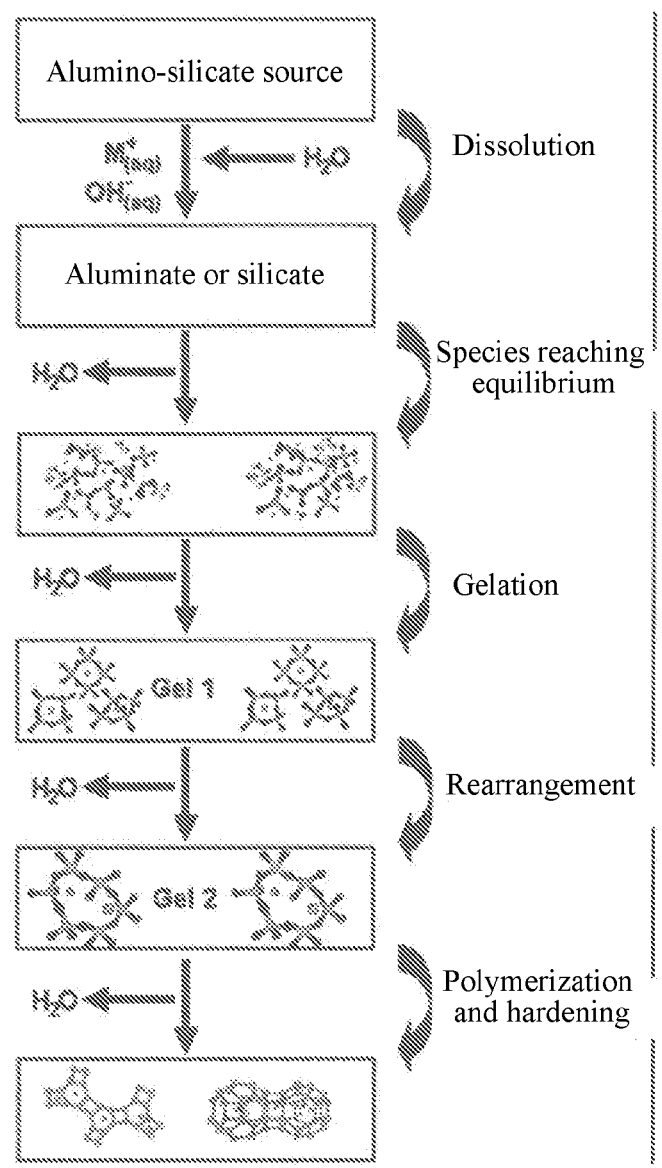

ENVIRONMENTALLY FRIENDLY CEMENT AND PRODUCTION METHOD THEREOF

CROSS REFERENCE TO RELATED APPLICATION

This application also claims priority to Taiwan Patent Application No. 105107597 filed in the Taiwan Patent Office on Mar. 11, 2016, the entire content of which is incorporated herein by reference.

TECHNICAL FIELD

The present invention relates to an environmentally friendly cement and a production method thereof, in which a thermal insulation wool and a waste thereof, and other waste materials are used as an active filler, thus achieving the recycled use of thermal insulation wools and wastes thereof potentially having radioactivity used in electric power plants and nuclear power plants especially.

BACKGROUND

Geopolymer is a 3-D structured alumino-silicate material similar to zeolite, which has a closed framework structure formed mainly by dissolving silicon and aluminum elements out from a mineral powder in a basic solution, and then bonding silica and aluminatetrahedrons to each other, and has excellent fire tolerance, heat insulation, acid and alkaline resistance, and mechanical properties. The basic raw material for the geopolymer is readily available, the preparation process and equipment are simple, and the geopolymer may be prepared at a normal temperature, thus receiving great attentions from various industries, and having a quite high potential for being developed into a new generation of environmentally friendly and green materials.

In 1940s, furnace slag in combination with an alkaline metal such as sodium hydroxide and potassium hydroxide was added by Purdon to cement for solidification and it was found during the research that the addition of alkaline metal can accelerate the hardening of the product (Purdon, A. O., *The action of alkalis on blast furnace slag*. Journal of the Society of Chemical Industry, 1940. 59: p. 191-202). As a result, the alkaline metal activated furnace slag cement (Trief cement) was largely used in 1950s. Hydrosodalite is prepared at 100° C. by Borchert by reacting kaolinite with sodium hydroxide (Borchert, W. and J. Keidel, *Beiträgezur-Reaktionsfähigkeit der Silikatebeiniedrigen Temperaturen-I. Mitteilung. Reaktionenzwischen Kaolin and NaOH*. Heidelberger BeiträgezurMineralogie and Petrographie, 1949. 1: p. 2.16.). It is found by Glukovskyin the study on activation of furnace slag with an alkaline metal that the product from the reaction of rock or clay with an alkaline metal contains calcium silicate hydrates and sodium alumino-silicate hydrates, that is, zeolite (Bedard, R. L., S. T. Wilson, L. D. Vail, J. M. Bennett, E. M. Flanigen, n. In Zeolites, n. Figures, and R. A. van Santen, Elsevier: Amsterdam, 1989. 1: p. 375.). In 1963, a type A zeolite was successfully synthesized by Howell by using metahalloysite as a raw material in place of the kaolinite to avoid the production of hydrosodalite. It can be known from above that since 1930s, the development of alumino-silicate materials is very fast. In 1972, a novel product having a compressive strength of up to 15 MPa was synthesized by the French scientist Davidovits by mixing kaolinite and quartz at a weight ratio of 1:1 with a specific concentration of a sodium hydroxide solution, and then follow-up studies was published in 1979; and the product was referred to as "geopolymer" (Davidovits, J., *Geopolymers*. Journal of Thermal Analysis and calorimetry, 1991. 37(8): p. 1633-1656). Hereto, a series of relevant researches and developments are carried out.

After over four decades of development, it is found after initial intense research that the geopolymer material similar to zeolite in structure has fire protection, thermal shock resistance, corrosion resistance, and other properties, then new use of geopolymer is persistently developed and the physical and chemical properties of the geopolymer are reinforced through various researches. The geopolymer is currently used in various industries in practice, for example, fire-resisting paint, fire compartment in an aircraft, and early setting cement.

A. Geopolymer

The geopolymer is generally produced by mixing, for example, an alumino-silicate mineral, an alkaline metal solution (KOH or NaOH) and a sodium silicate solution. A geopolymer precursor is formed by dissolving a silicon and aluminum rich mineral in a basic solution to evolve out silicon and aluminum elements in ion state on the surface of the mineral particles, and then a geopolymer having a strength is formed after dehydration and drying.

The mechanism of hardening of the geopolymer is not fully understood from the researches up to now, and thus the mechanism of hardening and formation of the geopolymer can only be learned indirectly by from the relation between the additive and the basic solution and the solubility. The solubility of the minerals in the basic solution plays an important role in the formation of the geopolymer, which affects the property of the geopolymer precursor and the geopolymerization. In view of this, it can be known that the final structure of the geopolymer and the properties thereof is closely correlated with the solubility of the minerals. If the solubility of the minerals is poor in the solution, insufficient colloid is produced. In this case, sodium silicate powder or water glass may be added to increase the agglutination between mineral particles and provides silica gel and the element sodium needed in the system, thereby facilitating the geopolymerization between the mineral particles.

B. Principle of Geopolymertechnology

In 1978, anamorphous to semi-crystalline 3-D alumino-silicate material developed by Joseph Davidovits was designated as "geopolymer", which refers to a mineral polymer formed by geopolymerization. The so-called geopolymerization means that Si and Al colloids are precipitated out on the particle surface when natural mineral materials or waste thereof containing alumino-silicate (in which $Al^{3+}$ is tetrahedrally or pentahedrally coordinated) and silicate are stood in a reaction environment containing an alkaline activating agent such as high concentration of sodium carbonate or alkaline metal silicate (e.g. $K_2SiO_3$ and $Na_2SiO_3$), to form a geopolymerprecursor as shown in formula (1). The geopolymerprecursor is further polymerized with the alkaline activating agent, to form the Si—O—Al—O backbone of the geopolymer, as shown in formula (2). The relevant chemical reaction formulas of the geopolymer are shown below:

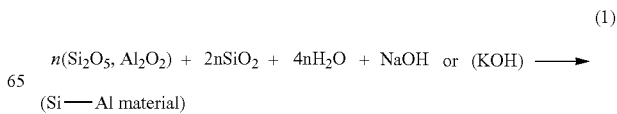

(1)

-continued

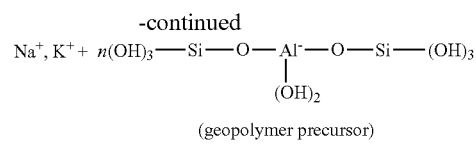

(geopolymer precursor)

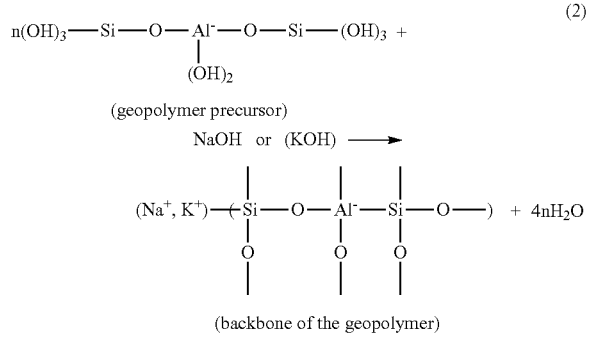

(backbone of the geopolymer)

Generally, the reaction mechanism for forming geopolymer mainly includes (1) dissolution of the alumino-silicate mineral powder in an alkaline activating agent; (2) diffusion of the dissolved silicon and aluminum ions from the surface of the solid particles to the interspace of the particles; (3) polymerization between the alkaline metal silicate solution and the silicon and aluminum ions; and (4) fractional removal of remaining water from the gel, solidification, and hardening to form a geopolymer material of the aluminosilicate. The reaction mechanism is shown in the FIGURE.

C. Conditions for Forming the Geopolymer

The raw materials for the geopolymer may be widely available, and any mineral and waste thereof containing silicon and aluminum elements may be used as long as the additives are well soluble in the basic solution. Therefore, such materials are preferably amorphous. The raw materials for the geopolymer comprise (1) an active filler; (2) an inert filler; and (3) a basic aqueous solution for the geopolymer. A material with the highest performance may be achieved at a suitable mixing ratio if the three ingredients can coordinate with each other.

In addition, considering the environmental issues, the waste thermal insulation materials such as perlite and rock wool containing silicon and aluminum need to be disposed properly. The thermal insulation wools, especially rock wool, are widely used in sound proof, heat preservation, thermal insulation, and fire protection. For example, these thermal insulation wools are widely used as a thermal insulation and heat preservation material in an incinerator or reacting furnace in nuclear power plants of Taiwan Power Company. The thermal insulation and heat preservation material needs to be replaced regularly, to ensure the thermal insulation and heat preservation of the incinerator or reacting furnace. As a result, many waste thermal insulation materials are produced every year, which should be disposed to avoid environmental pollution. The existing technology generally used for disposing the thermal insulation wool includes ultrahigh-pressure compression or plasma smelting, both of which require quantities of energy or special equipment, and thus have difficulties in disposal of a large amount of waste. Moreover, since the thermal insulation wool used in the nuclear power plant may contain radiant substances, the disposal after disuse is very important. Particularly, the disposal of thermal insulation wools after disuse is difficult because a very high temperature is required in the incineration of the thermal insulation wool, causing the incineration to be difficult. Therefore, there is an urgent need for a method for disposing the thermal insulation wool after disuse.

At present, there are a considerably large amount of waste thermal insulation wools to be disposed in Taiwan Power Company. Accordingly, it is advantageous from the perspective of environmental protection to develop an energy-efficient, safe, and inexpensive disposal method.

With the need to seek a method for recycling the waste material after disuse in mind, in the present invention, the waste is found to contain silicon and aluminum ingredients essential to the geopolymer, and an environmentally friendly cement material having economic value is produced by using the waste as a raw material for the geopolymer, thereby accomplishing the present invention.

By means of the environmentally friendly cement and the production method thereof according to the present invention, the waste previously discarded and disposed is recyclablely used as a material having economic value, and the harmful substance and/or radiant substance potentially present in the waste is embedded and solidified in the cement material, thereby solving the problem of waste disposal, which is of great potential from the perspective of environmental protection.

SUMMARY

According to the present invention, an environmentally friendly cement and production method thereof are provided, in which a thermal insulation wool and a waste thereof, and other waste materials are used as an active filler, thus achieving the recycled use of thermal insulation wools and wastes thereof potentially having radioactivity used in electric power plants and nuclear power plants especially.

The present invention relates to an environmentally friendly cement, which comprises (1) an active filler, comprising waste materials composed of a thermal insulation wool and a waste thereof; (2) an inert filler, comprising metakaolin and an aggregate optionally selected from cement, fine sand, gravel, waste to be solidified such as furnace slag, and organic resin; and (3) an aqueous solution of sodium metasilicate as an alkaline compound.

The present invention also relates to a method for producing an environmentally friendly cement, that is, an environmentally friendly cement comprising a mixture of (1) an active filler, comprising waste materials composed of a thermal insulation wool and a waste thereof; (2) an inert filler, comprising metakaolin and an aggregate optionally selected from cement, fine sand, gravel, waste to be solidified such as furnace slag, and organic resin; and (3) an aqueous solution of sodium metasilicate as an alkaline compound. The method comprises the steps of: (a) mixing the ingredient (1) with the ingredient (3), to obtain a first slurry; then mixing the ingredient (2) with the ingredient (3), to obtain a second slurry; subsequently, mixing the first slurry with the second slurry, to obtain a final slurry; and then hardening the final slurry. According to the preparation method, the elements silicon and aluminum in the ingredient (1) are dissolved out in the basic solution of the ingredient (3), and then a closed framework structure is formed by bonding silica and alumina as tetrahedrons to each other. In this way, an environmentally friendly cement having excellent fire tolerance, heat insulation, acid and alkaline resistance, and mechanical properties is obtained.

In the environmentally friendly cement and the preparation method thereof according to the present invention, the ingredient metakaolin used may be served as an active filler and also an inert filler due to its special properties that metakaolin can provide some Si and Al ingredients during the extraction process upon mixing with the basic aqueous solution, and the remaining metakaolin without being extracted is used as an inert filler.

In the environmentally friendly cement and the preparation method thereof according to the present invention, the thermal insulation wool and the waste thereof used in the ingredient (1) have a $SiO_2/Al_2O_3$ ratio of 7.0-9.5, and preferably 7.8-8.8, and preferably pulverized and sieved through a Mesh No. 18 to obtain particles with a particle size of less than 1.0 mm before use. The $SiO_2/Al_2O_3$ ratio in the thermal insulation wool and the waste thereof may be determined by X-ray fluorescence (XRF) analysis before use.

In the environmentally friendly cement and the preparation method thereof according to the present invention, the metakaolin used in the ingredient (2) has a $SiO_2/Al_2O_3$ ratio of 1.5-2.3, and preferably 1.7-1.9. The $SiO_2/Al_2O_3$ ratio in the metakaolin may be determined by X-ray fluorescence (XRF) analysis before use.

The aggregate in the ingredient (2) that is optionally selected from cement, fine sand, gravel, waste to be solidified such as furnace slag, and organic resin is not necessary, and the type is not limited as long as it can plays a role of filling. In order to improve the properties of the geopolymer material, the optional ingredients are desirably included. The ratio of the optional ingredients to the metakaolin is such that the final environmentally friendly cement has the properties essential to a cement.

In the environmentally friendly cement and the preparation method thereof according to the present invention, the sodium metasilicate used in the ingredient (3) has a $SiO_2/Na_2O$ ratio of 1.0-2.5, and preferably 1.5-1.8. Since sodium metasilicate has a high water solubility (of about 50 g/mL) and contains Si ingredient, sodium metasilicate is used as an alkaline compound in the method for preparing the environmentally friendly cement according to the present invention, which may provides Si ingredient to the cement to be produced, thus improving the shaping ability of the cement and reducing the formation of white efflorescence of the finish product cement caused by the eduction of $NaHCO_3$/$Na_2CO_3$ ingredient. Similarly, the $SiO_2/Al_2O_3$ ratio in sodium metasilicate used in the ingredient (3) may be determined by X-ray fluorescence (XRF) analysis before use.

In the environmentally friendly cement and the preparation method thereof according to the present invention, when the first slurry is mixed with the second slurry, the ratio of each ingredient is such that the $SiO_2/Na_2O$ ratio in the finally mixed slurry is in the range of 3.8-5.2, and preferably 4.1-4.8; and the $SiO_2/Al_2O_3$ ratio in the finally mixed slurry is in the range of 2.5-4.0, and preferably 2.8-3.5. If the $SiO_2/Na_2O$ ratio in the finally mixed slurry goes beyond this range, it may be controlled by further adding metakaolin. Upon mixing, the mixing device and rotation speed are not particularly limited, an ordinary mixing device for formulating the cement may be used, as long as the rotation speed can allow the ingredients in the slurry to be mixed fully.

By using the environmentally friendly cement and the preparation method thereof according to the present invention, cement blocks having excellent compressive strength, dissolution rate, weatherability, radiotolerance, water resistance, free water, fire tolerance, and bacterial resistance may be prepared. Therefore, in the environmentally friendly cement and the preparation method thereof according to the present invention, waste materials such as thermal insulation wool may be fully used again, such that the expense for disposing the wastes is saved and the wastes are converted into materials of economic benefits.

BRIEF DESCRIPTION OF DRAWINGS

The FIGURE shows the reaction mechanism of geopolymer.

DETAILED DESCRIPTION OF DISCLOSED EMBODIMENTS

According to a first objective of the present invention, an environmentally friendly cement is provided, which comprises (1) an active filler, comprising waste materials composed of a thermal insulation wool and a waste thereof; (2) an inert filler, comprising metakaolin and an aggregate optionally selected from cement, fine sand, gravel, waste to be solidified such as furnace slag, and organic resin; and (3) an aqueous solution of sodium metasilicate as an alkaline compound.

According to another objective of the present invention, a method for producing an environmentally friendly cement is provided, that is, producing an environmentally friendly cement comprising a mixture of (1) an active filler, comprising waste materials composed of a thermal insulation wool and a waste thereof; (2) an inert filler, comprising metakaolin and an aggregate optionally selected from cement, fine sand, gravel, waste to be solidified such as furnace slag, and organic resin; and (3) an aqueous solution of sodium metasilicate as an alkaline compound. The method comprises the steps of: (a) mixing the ingredient (1) with the ingredient (3), to obtain a first slurry, then mixing the ingredient (2) with the ingredient (3), to obtain a second slurry, and subsequently, mixing the first slurry with the second slurry, to obtain a final slurry, whereby the elements silicon and aluminum in the ingredient (1) are dissolved out in the basic solution of the ingredient (3), and then a closed framework structure is formed by bonding silica and alumina as tetrahedrons to each other. In this way, an environmentally friendly cement having excellent fire tolerance, heat insulation, acid and alkaline resistance, and mechanical properties is obtained.

The ingredients are described in detail below.

(1) Active Filler

The active filler useful in the present invention includes waste materials such as thermal insulation wool used in industry and a waste thereof, and especially thermal insulation wool used in reacting furnaces in factories and power plants and a waste thereof.

The thermal insulation wool in the active filler of the present invention may be for example perlite wool, rock wool, corundum wool, and other industrial waste, for example, industrial waste from fuel electric plant and/or nuclear power plant of Taiwan Power Company. The perlite wool contains about 50-70% of silica, with the balance being alumina. The rock wool contains silica and alumina at a ratio of about 1:1. The corundum wool is composed essentially of alumina. Therefore, the thermal insulation wool is rich in the silicon and aluminum elements needed for the geopolymer, thus being extremely suitable for being used as a material for geopolymer.

(2) Inert Filler

The inert filler mainly plays a role of "filling", to reinforce the properties of the geopolymer. For example, an aggregate such as cement, fine sand, gravel, waste to be solidified such as furnace slag, and organic resin may be used to increase the strength. The inert additive may also be any materials with filling property or with fire tolerance, thermal insulation, porosity, and other properties, to increase the particular applications of the geopolymer.

The environmentally friendly cement and the preparation method thereof according to the present invention are characterized in that the inert filler needs to contain metakaolin, because metakaolin can effectively provide the ingredients needed by, and increase the mechanical strength of the geopolymer. Kaolin is a clay mineral, and often found in the weathered layer of igneous rock and metamorphic rock. Kaolin has a chemical composition of $Al_4[Si_4O_{10}] \cdot (OH)_2$, and is a silicate mineral with a triclinic layered structure; and the fundamental building block is formed by bonding 1:1 silica tetrahedron to alumina octahedron via oxygen, and connected by hydrogen bonding therebetween. After kaolin is dehydrated at a high temperature (generally between 600-800° C.), Al is transitioned from an octahedrally coordinated position in kaolin to a tetrahedrally coordinated position in metakaolin. Therefore, metakaolin is of a structure with long-range disorder and short range existing as silica tetrahedron, and thus has a greatly increased activity. However, when kaolin is thermally treated at an excessively high temperature (above 800° C.), the activity is lost because the internal structure is completely destroyed (burn). Additionally, the incomplete solid structure easily causes unstable chemical properties, which allows the material to have a high activity.

The metakaolin used in the environmentally friendly cement and the preparation method thereof according to the present invention has a $SiO_2/Al_2O_3$ ratio of 1.5-2.3, and preferably 1.7-1.9.

(3) Aqueous Solution of Sodium Metasilicate as Alkaline Compound

The sodium metasilicate has a $SiO_2/Na_2O$ ratio of 1.0-2.5, and preferably 1.5-1.8. Since sodium metasilicate has a high water solubility (of about 50 g/mL) and contains Si ingredient, sodium metasilicate is used as an alkaline compound in the method for preparing the environmentally friendly cement according to the present invention, which may provides Si ingredient to the cement to be produced, thus improving the shaping ability of the cement and reducing the formation of white efflorescence of the finish product cement caused by the eduction of $NaHCO_3/Na_2CO_3$ ingredient.

EXAMPLE

The present invention is described in further detail with reference to examples below. However, the examples are provided for exemplification, instead of limiting the scope of the present invention.

In the examples below, the description is given by way of example in which commercially available thermal insulation wool is used as an active material. Because the material of the commercially available thermal insulation wool is the same as that of the spent thermal insulation wool, if the effect of the present invention can be achieved with the commercially available thermal insulation wool, the effect of the present invention can also be achieved with the spent thermal insulation wool in place of the commercially available thermal insulation wool.

Example 1

Preparation Method: Basic Geopolymerization

Materials:

Thermal insulation wool: perlite wool purchased from ISOLITE Industry Co., Ltd (Japan)

Metakaolin: metakaolin powder (25 kg/package) purchased from the manufacture catalogue of IMERYS Performance Minerals Inc (France).

Sodium metasilicate: sodium metasilicate powder (25 kg/package) purchased from the manufacture catalogue of Santos Inc (Taiwan).

Production Procedure of the Environmentally Friendly Cement (A) Extraction of Thermal Insulation Wool 1. The perlite thermal insulation wool was pulverized and sieved to obtain a powder with a particle size of less than the hole of Mesh No. 18.

2. 1,250 g of sodium metasilicate ($SiO_2/Na_2O$=1.5-1.8) was weighed, added to 2,500 mL of water, stirred uniformly until it was fully dissolved, to formulate a solution WG.

3. 75 g of pulverized and sieved perlite thermal insulation wool ($SiO_2/Al_2O_3$=7.9-8.7) was weighed, added to 200 mL of the solution WG, and stirred for 30-60 min at a constant speed of 300 rpm at normal temperature (25° C.), to extract $SiO_2$ and a small amount of $Al_2O_3$ contained in the perlite thermal insulation wool. In this manner, a first slurry was obtained.

(B) Formulation of Slurry Containing Inert Filler 1,000 g of metakaolin ($SiO_2/Al_2O_3$=1.7-1.9) was added, added to 2,300-1,900 mL of the solution WG, and uniformly mixed by uniformly stirring for 30-60 min at a rotation speed of 300 rpm. In this manner, a first slurry B was obtained.

(C) Formulation of Environmentally Friendly Cement

The first slurry was uniformly mixed with the second slurry, and then 1,000 g of metakaolin was added to adjust the $SiO_2/Na_2O$ ratio in the mixed slurry to 4.31 and adjust the $SiO_2/Al_2O_3$ ratio to 3.06, and stirred for 15-30 min at a constant speed of 300 rpm. The mixed slurry that was uniformly stirred was filled to a mold, and stood to harden and shape the slurry. In this way, the environmentally friendly cement of Example 1 was obtained.

Example 2

The steps in Example 1 were repeated, except that the ratio of the ingredients was changed as shown in Table 1; and the $SiO_2/Na_2O$ ratio in the mixed slurry was adjusted to 4.43, and the $SiO_2/Al_2O_3$ ratio was adjusted to 3.14, to obtain the environmentally friendly cement of Example 2.

Example 3

The steps in Example 1 were repeated, except that the ratio of the ingredients was changed as shown in Table 1; and the $SiO_2/Na_2O$ ratio in the mixed slurry was adjusted to 4.66, and the $SiO_2/Al_2O_3$ ratio was adjusted to 3.31, to obtain the environmentally friendly cement of Example 3.

Test Example

The environmentally friendly cements obtained in Examples 1 to 3 was evaluated for compressive strength, dissolution rate, weatherability, radiotolerance, water resistance, free water, fire tolerance, and bacterial resistance.

1. Uniaxial Compressive Strength

The test was conducted according to ASTM-C39. The product is accepted if the compressive strength is higher than 15 kgf/cm$^2$.

TABLE 1

| Example No. | Thermal insulation wool (g) | Sodium metasilicate (g) | Metakaolin (g) | Water (mL) | $SiO_2/Na_2O$ | $SiO_2/Al_2O_3$ | Compressive strength ($kgf/cm^2$) |
|---|---|---|---|---|---|---|---|
| 1 | 75 | 1,250 | 2,000 | 2,500 | 4.31 | 3.06 | 86 |
| 2 | 150 | 1,250 | 2,000 | 2,500 | 4.43 | 3.14 | 89 |
| 3 | 300 | 1,250 | 2,000 | 2,500 | 4.66 | 3.31 | 85 |

* The volume of 300 g thermal insulation wool is roughly equal to that of 2,000 g metakaolin.

2. Dissolution Rate Test

The dissolution rate test was carried out following a standard method for testing the dissolution rate of a solidified form, that is, the America Nuclear Society ANS 16.1 "Determination of dissolution rate of low level radioactive solidified form by a short test procedure". The various dissolution rate indices of the solidified form should be greater than 6. The test result is shown in Table 2.

TABLE 2

| Time | Example 1 (ppm) | Example 2 (ppm) | Example 3 (ppm) | Average (ppm) | Index |
|---|---|---|---|---|---|
| 2 h | 5.342 | 14.35 | 9.273 | 9.65 | 5.2 |
| 7 h | 3.371 | 6.392 | 5.816 | 5.19 | 5.6 |
| 24 h | 1.527 | 5.304 | 3.709 | 3.51 | 6.5 |
| 48 h | 1.304 | 4.252 | 5.283 | 3.61 | 6.2 |
| 72 h | 2.229 | 1.401 | 5.186 | 2.94 | 6.3 |
| 96 h | 2.603 | 1.169 | 3.353 | 2.38 | 6.3 |
| 120 h | 1.014 | 1.616 | 1.827 | 1.49 | 6.6 |
| 456 h | 0 | 0 | 0 | 0 | — |
| 792 h | 0 | 0 | 0 | 0 | — |

Average dissolution time = 6.1

Average dissolution time=6.1

3. Weatherability Test

Weather resistance test was carried out by placing the test sample in a weatherability tester, and then changing the temperature and humidity in the tester according to the set conditions in steps 00-08, in which 30 cycles of the steps 00-08 were performed. The result denotes the weatherability after exposure to an extreme environment for 30 years. The result is shown in Table 3 below.

TABLE 3

| Step | HH:MM | Temperature ° C. | Humidity % |
|---|---|---|---|
| 00 | 0:05 | 25 | 60 |
| 01 | 1:00 | 25 | 60 |
| 02 | 0:20 | 60 | 90 |
| 03 | 1:00 | 60 | 90 |
| 04 | 0:40 | 25 | 60 |
| 05 | 1:00 | 25 | 60 |
| 06 | 0:40 | −10 | 0 |
| 07 | 1:00 | −10 | 0 |
| 08 | 0:20 | 25 | 60 |

Time setting: HH (hr), MM (min), for example, 1:40 is 1 hour and 40 minutes.

Time setting: HH (hr), MM (min), for example, 1:40 is 1 hour and 40 minutes.

4. Free Water

The test was conducted according to ANSI/ANS55.1. The product is accepted if the free water content is less than 0.5% of the volume of the solidified form, and the pH value of free water is above 6. According to the visual examination results of the environmentally friendly cements obtained in Examples 1-3, no free water is produced on all of the environmentally friendly cements, suggesting that the environmentally friendly cement produced according to the present invention meets the requirement.

5. Water Resistance

The compressive strength of the test sample was tested 90 days after being immersed in water. The compressive strength may be an index of water resistance, and the product is accepted if the compressive strength is higher than 15 $kgf/cm^2$. The result is shown in Table 4 below.

TABLE 4

| No | Compressive strength ($kgf/cm^2$) |
|---|---|
| 1 | 84 |
| 2 | 87 |
| 3 | 81 |

In addition, since the environmentally friendly cement of the present invention is a cement-like material, and composed exclusively highly basic (9<pH<11) inorganic materials, the environmentally friendly cement undoubtedly has a fire tolerance, and may be directly judged to have a bacterial resistance according to its highly basic inorganic composition.

It can be known from the results above that by virtue of the environmentally friendly cement and the preparation method thereof according to the present invention, a route is found for the waste thermal insulation wool that is previously useless and should be discarded and properly disposed, such that the waste that is previously discarded is converted into a material of economic benefit. For the environmentally friendly cement and the preparation method thereof according to the present invention, the treatment procedure is simple, safe, and low in cost, thus being applicable to solve the existing problem of wastes stored in Taiwan Power Company, and of great value in industry.

What is claimed is:

1. An environmentally friendly cement, comprising (1) an active filler, comprising waste materials composed of a thermal insulation wool and a waste thereof; (2) an inert filler, comprising metakaolin; and (3) an aqueous solution of sodium metasilicate as an alkaline compound, wherein the $SiO_2/Na_2O$ ratio and $SiO_2/Al_2O_3$ ratio in the environmentally friendly cement is in the range of 4.31-4.46 and 3.06-3.31 respectively.

2. A method for preparing an environmentally friendly cement comprising a mixture of (1) an active filler, comprising waste materials composed of a thermal insulation wool and a waste thereof; (2) an inert filler, comprising metakaolin; and (3) an aqueous solution of sodium metasilicate as an alkaline compound, the method comprising the steps of (a) mixing the ingredient (1) with the ingredient (3), to obtain a first slurry; then mixing the ingredient (2) with the ingredient (3), to obtain a second slurry; subsequently, mixing the first slurry with the second slurry, to obtain a final slurry; and then hardening the final slurry; and then hardening the finally mixed slurry, wherein thermal insulation wool and the waste thereof used in the ingredient (1) have a $SiO_2/Al_2O_3$ ratio of 7.0-9.5, the metakaolin in the ingredient (2) has a $SiO_2/Al_2O_3$ ratio of 1.5-2.3, and wherein the sodium metasilicate in the ingredient (3) has a $SiO_2/Na_2O$ ratio of 1.5-1.8.

3. The method for producing an environmentally friendly cement according to claim 2, wherein the $SiO_2/Na_2O$ ratio and $SiO_2/Al_2O_3$ ratio in the environmentally friendly cement is in the range of 4.31-4.46 and 3.06-3.31 respectively.

* * * * *